United States Patent
Kaji et al.

(10) Patent No.: US 8,365,660 B2
(45) Date of Patent: Feb. 5, 2013

(54) PRINTING PRESS AND PRINTING METHOD (75) Inventors: Makoto Kaji, Hiroshima-ken (JP);
Norifumi Tasaka, Hiroshima-ken (JP);
Takahide Toshito, Hiroshima-ken (JP);
Koji Nishiyama, Hiroshima-ken (JP)

(73) Assignee: Mitsubishi Heavy Industries Printing & Packaging Machinery, Ltd., Hiroshima (JP)

( * ) Notice: Subject to any disclaimer, the term of this patent is extended or adjusted under 35 U.S.C. 154(b) by 231 days.

(21) Appl. No.: 12/919,614

(22) PCT Filed: Feb. 19, 2009

(86) PCT No.: PCT/JP2009/052900
§ 371 (c)(1),
(2), (4) Date: Aug. 26, 2010

(87) PCT Pub. No.: WO2009/107545
PCT Pub. Date: Sep. 3, 2009

(65) Prior Publication Data
US 2010/0326297 A1 Dec. 30, 2010

(30) Foreign Application Priority Data

Feb. 28, 2008 (JP) .............................. 2008-048252
Mar. 14, 2008 (JP) .............................. 2008-066509

(51) Int. Cl.
*B41M 1/14* (2006.01)

(52) U.S. Cl. ..................................... 101/211; 101/178
(58) Field of Classification Search ................... 101/211
See application file for complete search history.

(56) References Cited

U.S. PATENT DOCUMENTS

| 4,604,083 | A | * | 8/1986 | Barny et al. ..................... 493/34 |
| 5,043,749 | A | * | 8/1991 | Punater et al. ................. 347/130 |
| 5,080,337 | A | * | 1/1992 | Mayer et al. .................. 270/1.02 |
| 5,533,453 | A | * | 7/1996 | Wolfberg et al. .............. 101/485 |
| 5,906,156 | A | * | 5/1999 | Shibuya et al. ............. 101/93.12 |
| 6,082,521 | A | * | 7/2000 | Maier et al. ................. 198/349.6 |
| 6,384,932 | B1 | * | 5/2002 | Fujisawa et al. ............. 358/1.18 |
| 7,451,698 | B2 | * | 11/2008 | Schneider et al. ........ 101/424.2 |
| 8,136,936 | B2 | * | 3/2012 | Hook et al. .................... 347/103 |

(Continued)

FOREIGN PATENT DOCUMENTS

| JP | 04247995 A | 9/1992 |
| JP | 8118757 | 5/1996 |

(Continued)

OTHER PUBLICATIONS

Japan Digital Printing Newspaper Technical Information vol. 39-266, Feb. Edition, 2007.

(Continued)

*Primary Examiner* — Anthony Nguyen
(74) *Attorney, Agent, or Firm* — Lowe Hauptman Ham & Berner LLP (57) ABSTRACT

In a printing press and a method, provided are an offset rotary press for printing predetermined information on a web using a printing plate, a printer for digitally printing specific information desired by a reader and reader identification information at a specific location on a web surface, and a dispatch system for reading the reader identification information on a newspaper, thereby sorting the newspaper by delivery destination. The offset rotary press and the printer are collectively driven by a controller, thereby improving the productivity of printed matter.

14 Claims, 3 Drawing Sheets

U.S. PATENT DOCUMENTS

| | | |
|---|---|---|
| 2004/0027608 A1 | 2/2004 | Kinjo |
| 2005/0096938 A1 | 5/2005 | Slomkowski et al. |
| 2007/0240592 A1 | 10/2007 | Ronecker et al. |
| 2010/0269719 A1 | 10/2010 | Schulmeister et al. |

FOREIGN PATENT DOCUMENTS

| | | |
|---|---|---|
| JP | 08290543 A | 11/1996 |
| JP | 10216643 A | 8/1998 |
| JP | 10286939 B2 | 10/1998 |
| JP | 11138915 | 5/1999 |
| JP | 2946201 | 7/1999 |
| JP | 2002046365 A | 2/2002 |
| JP | 2002298017 A | 10/2002 |
| JP | 2003338902 A | 11/2003 |
| JP | 2004074738 | 3/2004 |
| JP | 2007276469 | 10/2007 |
| JP | 2011502830 | 1/2011 |
| WO | 2006050027 A2 | 5/2006 |

OTHER PUBLICATIONS

International Search Report for PCT/JP2009/052900 issued Apr. 14, 2009.

Written Opinion of the International Searching Authority for PCT/JP2009/052900.

Japanese Office Action for Application No. 2008-066509 mailed Jun. 5, 2012.

* cited by examiner

PRINTING PRESS AND PRINTING METHOD

RELATED APPLICATIONS

The present application is a national phase of PCT/JP2009/052900, filed Feb. 19, 2009, and claims priority from, Japanese Application Numbers 2008-048252, filed Feb. 28, 2008, and 2008-066509, filed Mar. 14, 2008.

TECHNICAL FIELD

The present invention relates to a printing press and a printing method for preparing printed matter, such as newspapers, advertisement, or magazines, using two types of printing presses.

BACKGROUND ART

For example, newspapers are printed by offset rotary presses. This newspaper offset rotary press is made up of a plurality of paper feeders, a plurality of printing units, a turn-bar unit, and a folding unit. Accordingly, each paper feeder feeds a web to a printing unit to conduct printing on each web. Then, the traveling routes of a plurality of webs are changed in the turn-bar unit, and then the plurality of webs are overlapped in the predetermined order. After that, in the folding unit, the webs are folded transversely to be then laterally cut at predetermined lengths and folded laterally, thereby forming a signature which is then discharged as newspapers.

A printing unit in such a newspaper offset rotary press requires a printing plate for printing articles or advertisement, and the printing plate is wound around a printing plate cylinder to conduct the printing operation. For this reason, to replace articles or advertisement, the printing unit has to be stopped to replace the printing plate. Thus, this may lead to a reduction in productivity of printing newspapers or to waste sheets.

Furthermore, when a reader having her/his interest in a particular field reads a newspaper, the reader must check all the newspaper pages by herself/himself to know the detailed contents though the pages are roughly classified by the type of articles or advertisement.

Note that a newspaper offset rotary press disclosed in Patent Documents 1 and 2 below is provided with an inkjet printing unit in addition to a printing unit, so that newspapers can be continuously printed without stopping the printing press.

PRIOR ART DOCUMENTS

Patent Documents

Patent document 1: Japanese Patent No. 2946201
Patent document 2: Japanese Patent Application Laid-Open No. Hei 08-290543

DISCLOSURE OF INVENTION

Problem to be Solved by the Invention

The aforementioned conventional newspaper offset rotary press is provided with an inkjet printing unit in addition to a printing unit. Thus, when articles or advertisement have to be replaced, the inkjet printing unit allows for continuously printing newspapers without stopping the printing press. However, to print articles or advertisement in a wider area using the inkjet printing unit mounted on the rotary press, multiple units need to be provided in parallel to conduct the printing operation at high speeds. Thus, this configuration requires high costs for spending on new plant and equipment. Furthermore, the printing by the inkjet printing unit is more costly than by the rotary press, thus making it difficult to yield high cost performance.

The present invention was developed to solve the aforementioned problems. It is an object of the invention to provide a printing press and a printing method for improving the productivity of printed matter.

Means for Solving Problem

According to an aspect of the present invention, a printing press includes: a rotary press for printing predetermined information on a sheet using a printing plate; a digital printer for digitally printing specific information desired by a reader at a specific location on a sheet surface; and a controller for collectively driving the rotary press and the digital printer.

Advantageously, in the printing press, the digital printer includes: an information database for classifying and storing the predetermined information; a reader database for storing a class of the specific information desired by the reader; a print data creation unit for selecting and laying out information based on the information of the information database and the information of the reader database; and a digital printer body for digitally printing the information laid out by the print data creation unit.

Advantageously, in the printing press, the print data creation unit creates an identifier to access a detail of the laid-out information viewable through a network.

Advantageously, in the printing press, the digital printer digitally prints the specific information desired by the reader and reader identification information, and the printing press further includes a sorting unit for sorting a printed matter by delivery destination by reading the reader identification information.

Advantageously, in the printing press, the digital printer prints an index of an article or an advertisement desired by the reader on a front page.

Advantageously, in the printing press, the digital printer is located downstream of a folding cylinder of the rotary press and prints the specific information on a sheet which has been slowed down from a printing speed.

According to another aspect of the present invention, a printing method includes: allowing a rotary press to print predetermined information on a sheet using a printing plate; and allowing a digital printer to digitally print specific information desired by a reader at a specific location on a sheet surface.

Advantageously, in the printing method, the digital printer prints the specific information on a signature, the signature being formed by the rotary press and slowed down from a printing speed.

Effect of the Invention

A printing press of the invention set forth in claim 1 is provided with a rotary press for printing predetermined information on a sheet using a printing plate; a digital printer for digitally printing specific information desired by a reader at a specific location on a sheet surface; and a controller for collectively driving the rotary press and the digital printer. Accordingly, since the digital printer prints specific information desired by a reader only at a specific location on a sheet surface, it is possible to improve the productivity of printed matter without stopping the printing press and without reducing the printing speed.

A printing press of the invention set forth in claim 2 is configured such that the digital printer is provided with an information database for classifying and storing predetermined information, a reader database for storing a class of specific information desired by a reader, print data creation means for selecting and laying out information based on the information in the information database and the information of the reader database, and a main digital printer body for digitally printing the information laid out by the print data creation means. It is thus possible to easily lay out the specific information desired by the reader and conduct edit works with better efficiency.

A printing press of the invention set forth in claim 3 is configured such that the print data creation means creates an identifier to access a detail of the laid-out information viewable through a network. Thus, the reader can use a reading device to read the identifier to connect to the network indicated by the identifier. It is thus possible to collect the details of the laid out information and transmit the information, providing improved convenience of printed matter.

A printing press of the invention set forth in claim 4 is configured such that the digital printer digitally prints specific information desired by a reader and reader identification information, and the printing press further includes sorting means for reading the reader identification information to thereby sort printed matter by delivery destination. Accordingly, since the reader identification information is printed on the sheet surface, the printed matter and the reader can be readily associated with each other. It is thus possible to read the reader identification information by the sorting means, thereby facilitating the sorting of the printed matter by delivery destination and improving the efficiency of the delivery tasks.

A printing press of the invention set forth in claim 5 is configured such that the digital printer prints an index of an article or advertisement desired by a reader on a front page. This allows for readily preparing newspapers, for example, by individual, group, or district, thus enabling it to provide personalized articles or advertisement. As a result, printing the reader's specific index using the reader database makes it possible to attract the reader to the reader-oriented advertisement, thereby providing improved high cost performance for advertisement.

A printing press of the invention set forth in claim 6 is configured such that the digital printer is located downstream of a folding cylinder of the rotary press and prints specific information on a sheet which has been slowed down from a printing speed. When compared with the case wherein the digital printer is located immediately after the printing unit, it is possible for the digital printer to print information on a sheet running at lower speeds, thus allowing even a low-speed digital printer to conduct in-line printing.

A printing method of the invention set forth in claim 7 includes allowing a rotary press to print predetermined information on a sheet using a printing plate, and allowing a digital printer to digitally print specific information desired by a reader at a specific location on a sheet surface. Accordingly, since the digital printer prints specific information desired by a reader only at a specific location on a sheet surface, it is possible to improve the productivity of printed matter without stopping the printing press.

A printing method of the invention set forth in claim 8, wherein the digital printer prints specific information on a signature, the signature being formed by the rotary press and slowed down from a printing speed. When compared with the case wherein the digital printer is located immediately after the printing unit, it is possible for the digital printer to print information on a signature running at lower speeds, thus allowing even a low-speed digital printer to conduct in-line printing.

EXPLANATIONS OF LETTERS OR NUMERALS

11 offset rotary press
12 printer (digital printer)
13 dispatch system
21 paper feeder
22 printing unit
23 turn-bar unit
24 folding unit
31 controller
32 first control section
33 second control section
34 operation panel
35 information database
36 reader database
49*a*, 49*b* folding cylinder
51*a*, 51*b* folding roller
52*a*, 52*b* bladed wheel
53*a*, 53*b* discharge conveyor

BEST MODE(S) FOR CARRYING OUT THE INVENTION

Now, referring to the accompanying drawings, a description will be made in more detail to preferred embodiments of a printing press and a printing method in accordance with the present invention. It should be noted that the present invention will not be limited by the embodiments.

[First Embodiment]

Figure 1:
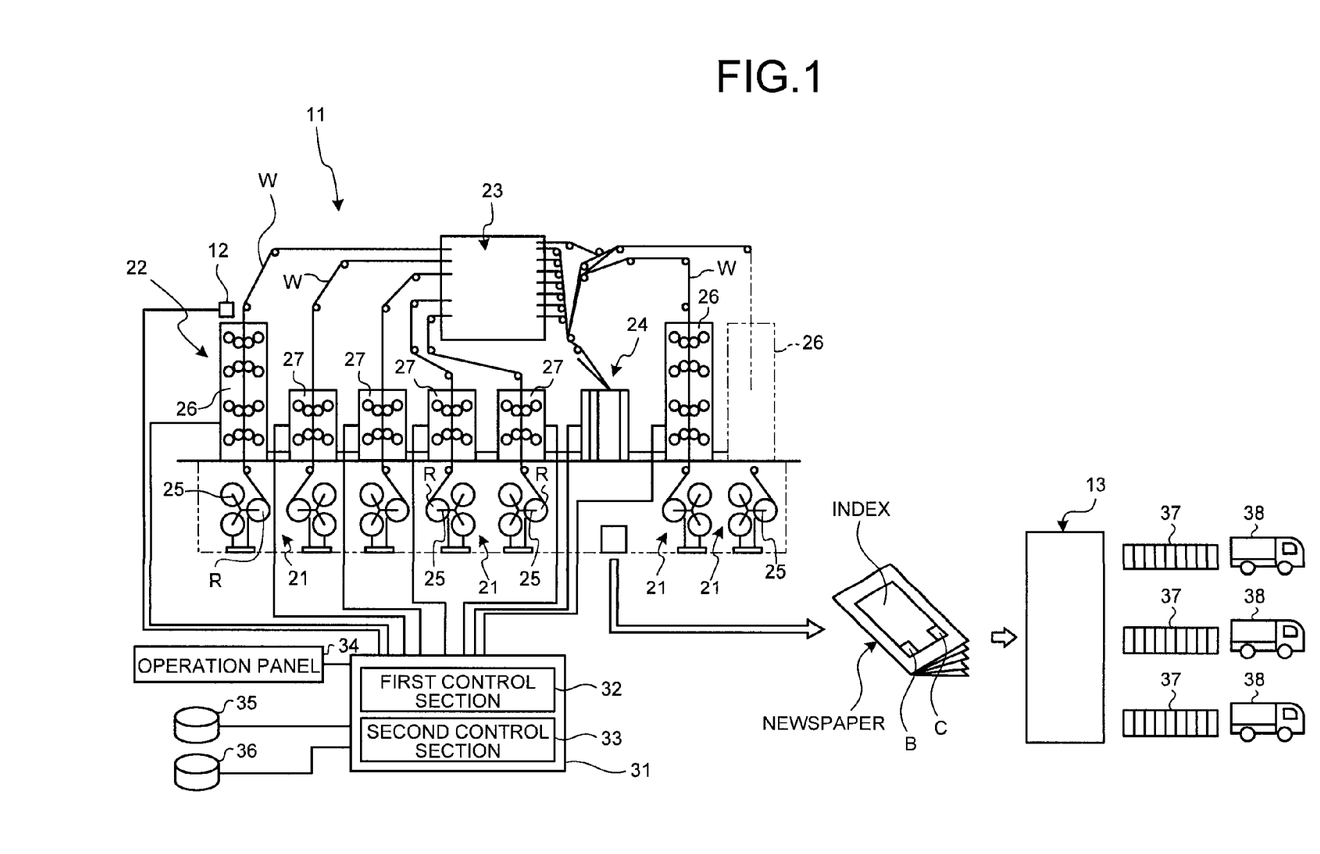
FIG. 1 is a schematic block diagram illustrating a printing press according to a first embodiment of the present invention.
Figure 2:
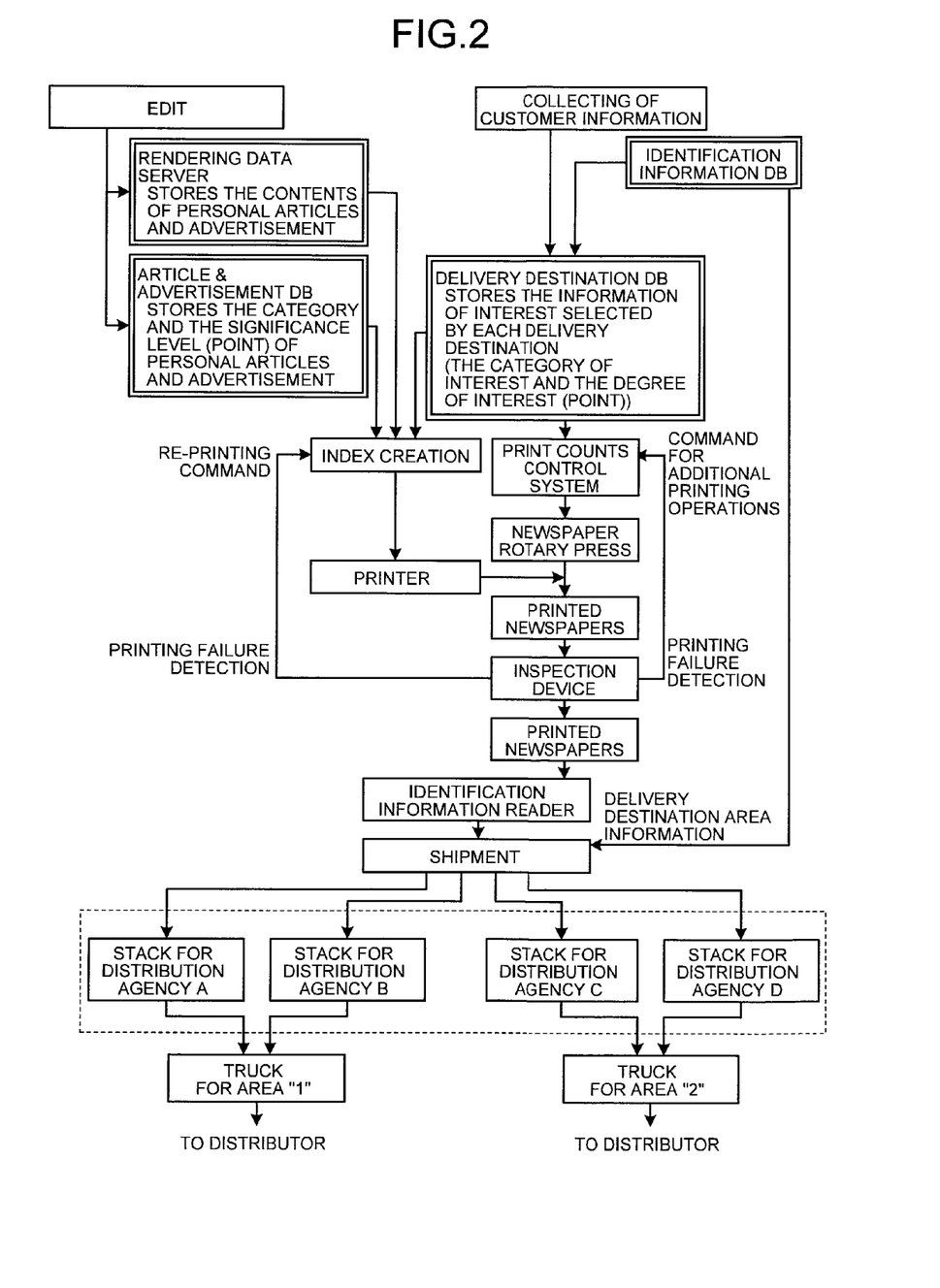
FIG. 2 is a flowchart showing a method for preparing printed matter in the printing press of the first embodiment.

FIG. 1 is a schematic block diagram illustrating a printing press according to a first embodiment of the present invention, and FIG. 2 is a flowchart showing a method for preparing printed matter in the printing press of the first embodiment.

As shown in FIG. 1, the printing press of the first embodiment is applied to a printing press for preparing newspapers as printed matter. That is, this printing press is made up of an offset rotary press 11, a printer 12, and a dispatch system 13. The offset rotary press 11 prints predetermined information on a web (sheet) using a printing plate. The printer 12 serves as a digital printer (on-demand printing press) for digitally printing specific information desired by a reader and reader identification information (reader identification code) C at a specific location on the web surface. The dispatch system 13 serves as sorting means for sorting newspapers by delivery destination. The offset rotary press 11 and the printer 12 can be collectively driven by a controller 31.

The offset rotary press 11 includes a plurality of paper feeders 21, a plurality of printing units 22, a turn-bar unit 23, and a folding unit 24.

Each of the paper feeders 21 is provided with gripper arms 25 for holding a plurality of web reels R around each of which a web W is wound in the shape of roll. The gripper arms 25 are rotated, thereby allowing the web reel R to be rotated to the web feed position. Furthermore, each of the paper feeders 21 is provided with a web relay mechanism (not shown), which when the web being unreeled from the web reel R at the web feed position is coming to its end, allows that web reel R at the web feed position to be relayed to a subsequent stand-by web reel R.

Furthermore, the printing unit 22 is provided with a multi-color printing unit 26 for conducting the two-sided 4-color printing operation, and a 2-color printing unit 27 for conducting the two-sided 2-color printing operation. The multi-color printing unit 26 and the 2-color printing unit 27 can conduct the predetermined printing operation on the web W supplied from each of the paper feeders 21. Note that in the present embodiment, the printing unit 22 was made up of the multi-color printing unit 26 and the 2-color printing unit 27. However, the invention is not limited to this configuration. For example, various types of units such as a two-sided single-color printing unit for the two-sided single-color printing and a multi-color printing unit for the single-side 4-color or 2-color printing can be appropriately combined depending on the printed matter.

Furthermore, the turn-bar unit 23, which is provided with a plurality of turn-bars (not shown), changes the traveling route of each web W fed from each of the printing units 26 and 27 to stack the webs in the predetermined order. The folding unit 24 transversely folds the web W transported from the turn-bar unit 23, laterally cuts it at the predetermined length, and further laterally folds it to form a desired signature, which is then ejected.

On the other hand, the printer 12 is a digital printer that is capable of receiving and printing data as created by an editor system or the like. The printer 12 can employ any rendering scheme such as the inkjet scheme or the electronic printing scheme. The printer 12 is located downstream of the printing unit 17 in the transport route of the web W.

The controller 31 connected with an operation panel 34 includes a first control section 32 for collectively driving the offset rotary press 11 and a second control section 33 for collectively driving the printer 12. The first control section 32 collectively drives the paper feeder 21, the printing unit 22, the turn-bar unit 23, and the folding unit 22 in the offset rotary press 11, thereby conducting the entire printing operation except on a predetermined area (specific portion) of the front page (the first page) of a newspaper. In this case, the printing is conducted on the front page (the first page) of a newspaper using a printing plate cylinder of the printing unit 22, which carries thereon a printing plate (not shown) that provides the front page of a newspaper with a predetermined blank area (specific portion).

The second control section 33 collectively drives the printer 12, thereby conducting the printing operation on the predetermined area of the front page (the first page) of a newspaper. On this predetermined area or a blank area given on the front page of a newspaper in the printing unit 22 of the offset rotary press 11, the printer 12 prints the individual reader's index (the index of advertisement or an article relating to politics, economics, finance, sports, entertainment, culture, living, or society) and reader identification information C. Furthermore, this predetermined area also contains an identifier (such as a one-dimensional barcode or two-dimensional barcode) B which allows for viewing the information in detail through a network. It is also possible to print the name and address of the reader; however, from the view point of protecting personal information, only the identification code can be printed. Even in this case, a newspaper deliverer can carry an identification code reading device, thereby facilitating smooth delivery.

The second control section 33 is connected with an information database 35 and a reader database 36. The information database 35 classifies and then stores predetermined information, i.e., articles or advertisement by category (such as politics, economics, finance, sports, entertainment, culture, living, or society) and by district. The reader database 36 stores the name, age, family structure, address, and distributor of a reader as well as classifies and then stores specific information desired by the reader, i.e., articles or advertisement of the reader's interest by category (such as politics, economics, finance, sports, entertainment, culture, living, or society). On the other hand, the category and the reader's information are not limited to those mentioned above.

The second control section 33 also serves as print data creation means which selects the specific information desired by a reader (such as articles or advertisement) and creates the index to be automatically laid out based on the information of the information database 35 and the information of the reader database 36. Then, the second control section 33 allows the printer (the main digital printer body) 12 to digitally print the automatically laid out index and the reader identification information C.

The dispatch system 13 reads the reader identification information C printed on a newspaper by the offset rotary press 11 and the printer 12, thereby sorting the newspaper by delivery destination. To this end, the dispatch system 13 is provided with a plurality of conveyors 37 for transporting newspapers sorted by delivery destination, each conveyor 37 allowing the newspaper to be loaded onto each truck 38.

A description will now be made in more detail to a method for preparing newspapers using the aforementioned printing press according to the present embodiment.

In the method for preparing newspapers, as shown in FIGS. 1 and 2, the operator manipulates the operation panel 34 to collectively drive the offset rotary press 11 by the controller 31 (the first control section 32), thereby printing newspapers. That is, each of the paper feeders 21 supplies a web W to the multi-color printing unit 25 and the 2-color printing unit and 26, which constitute the printing unit 22, and then each of the printing units 25 and 26 conducts the 4-color printing or the 2-color printing on each web W. Then, the turn-bar unit 23 changes the traveling route of each of the plurality of webs W on which printing was conducted by each of the printing units 25 and 26 to stack the webs W in the predetermined order. Then, the webs W stacked in layers are transported to the folding unit 24. In the folding unit 24, the webs W are folded transversely by a triangular plate (not shown), then fed downwardly by a lead-in roller and a nipping roller, laterally cut by the folding cylinder and the saw cylinder, and sandwiched by a pair of folding rollers to thereby form a signature. Finally, thus prepared newspaper is discharged by the bladed wheel onto the discharge conveyor.

At this time, the newspaper has been printed by the printing unit 22 to contain a predetermined blank area on the front page. Furthermore, in this case, the first control section 32 controls the number or count of printed newspapers, so that when an inspection device has found a problem with the printed matter resulting from a printing failure or caused by any other reason, the first control section 32 feeds back the count in a command for additional printing operations.

As predetermined edit works, the originals of today's articles or advertisement may be created and sorted according to their category and then stored in the information database 35 together with their significance level (point). In this case, the articles or advertisement are stored as image data. Furthermore, the name, address, and distributor of a reader as well as the specific information desired by the reader, i.e., the articles or advertisement of the reader's interest can be sorted by category and then stored in the reader database 36. This allows for assigning priorities to the print data.

Then, to create indices, the second control section 33 automatically lays out the index of the article or advertisement that is selected in consideration of the originals of the articles or advertisement stored in the information database 35 and the articles or advertisement of the reader's interest stored in the reader database 36. In this case, the significance level of the articles or advertisement stored in the information database 35 is given points, while the category of the article or advertisement of the reader's interest stored in the reader database 36 is also given points. Both the points are multiplied by each other, so that the article or advertisement of the resulting value is selected in the descending order of the value to lay out the index.

At this time, the information database 35 stores not only the text or image of the articles or advertisement but also an identifier B indicative of the address of the network site in which the latest information on the article is available. Then, when creating print data, the identifier is automatically laid out.

Subsequently, the operator operates the operation panel 34 in harmony with the operation of the newspaper rotary press, so that the operation allows the controller 31 (the second control section 33) to collectively drive the printer 12 in parallel to the offset rotary press 11, thereby printing the index of the automatically laid out index on the predetermined blank area provided on the front page of the newspaper by the printing unit 22. At this time, the predetermined blank area is filled with the name of the newspaper, the name and address of the reader, the index of the article or advertisement desired by the reader as well as the reader identification information C.

In this case, the second control section 33 monitors the number or count of printed index portions, so that when the inspection device has found a problem with the printed matter resulting from a printing failure or caused by any other reason, the second control section 33 feeds back the number in a command for additional printing operations.

The newspaper printed by the offset rotary press 11 and the printer 12 are transported, for example, on a carrier or conveyor (not shown) to the dispatch system 15. The dispatch system 13 allows an identification information reading device to read the reader identification information C printed for display on the newspaper and determines the distribution agency and the dispatch area with reference to the reader database 36. Then, each newspaper is sorted onto the conveyor 37 by delivery destination to form a stack for the distribution agency.

When the newspapers are stacked to the predetermined count, the stack is labeled, loaded onto the truck 38 for the predetermined distribution area, and shipped to the distribution agency.

As described above, the printing press of the first embodiment is provided with the offset rotary press 11 for printing predetermined information on a web using a printing plate, and the printer 12 for digitally printing the specific information desired by a reader and the reader identification information C at a specific location on the web surface. The offset rotary press 11 and the printer 12 can be collectively driven by the controller 31.

Accordingly, the offset rotary press 11 prints articles or advertisement on areas except a predetermined area on the front page, and the printer 12 prints the index of the specific article or information desired by a reader and the reader identification information on the predetermined area of the front page. This allows for printing information common to all the readers on the newspaper except the specific area on the front page where the individual index for each reader is printed. The newspaper contents and the index are printed by different printing presses without stopping the offset rotary press 11, thereby improving the productivity of printed matter as well as allowing the value of the printed matter to be improved for the reader. Furthermore, since the reader identification information is printed on the front page, the newspaper and the reader can be readily associated, thereby facilitating the delivery tasks.

Furthermore, the printing press of the first embodiment is provided, as the printer 12, with the information database 35 for classifying and storing predetermined articles or advertisement information, and the reader database 36 for storing a class of the specific article or advertisement that is desired by a reader. The second control section 33 selects predetermined information and then automatically lays out the indices based on the information of the information database 35 and the information of the reader database 36. Accordingly, the index can be readily laid out based on the specific information desired by the reader, thereby allowing edit works with improved efficiency.

Furthermore, according to the printing press of the first embodiment, the second control section 33 creates a one-dimensional or two-dimensional barcode as an identifier which allows for viewing the laid out information in more detail through a network. That is, the detailed information of each article or advertisement or a barcode indicative of the address of a network site, in which the reader can place an order relating to the advertisement, is printed at the same time as part of personalized articles or advertisements. Accordingly, the reader can read the barcode using a reading device such as the cellular phone and connect to the network indicated by the barcode to view the laid out information in more detail. The detailed article can be collected or an order can be placed relating to the article or advertisement, thereby improving the convenience of printed matter and the attraction of advertisement. Additionally, it can be recorded on the network site whether the site was viewed or an order was placed therein. This allows for grasping the area of the reader's interest and feeding the results back to the reader database 36.

Furthermore, the printing press of the first embodiment allows the printer 12 to digitally print the specific information desired by the reader and the reader identification information C, and includes the dispatch system 13 which reads the reader identification information C, thereby sorting the newspaper by delivery destination. Accordingly, printing the reader identification information C on the front page of a newspaper makes it easier to associate the newspaper with the reader. Reading the reader identification information C by the dispatch system 13 allows for readily sorting the newspaper by delivery destination, thereby improving the efficiency of the delivery tasks.

Furthermore, the printing press of the first embodiment provides printed matter as newspapers and allows the printer 12 to print the index of the article or advertisement desired by the reader or the reader identification information on the front page. This allows for preparing newspapers, for example, by individual, group, or district, enabling it to provide personalized articles or advertisement.

[Second Embodiment]

Figure 3:
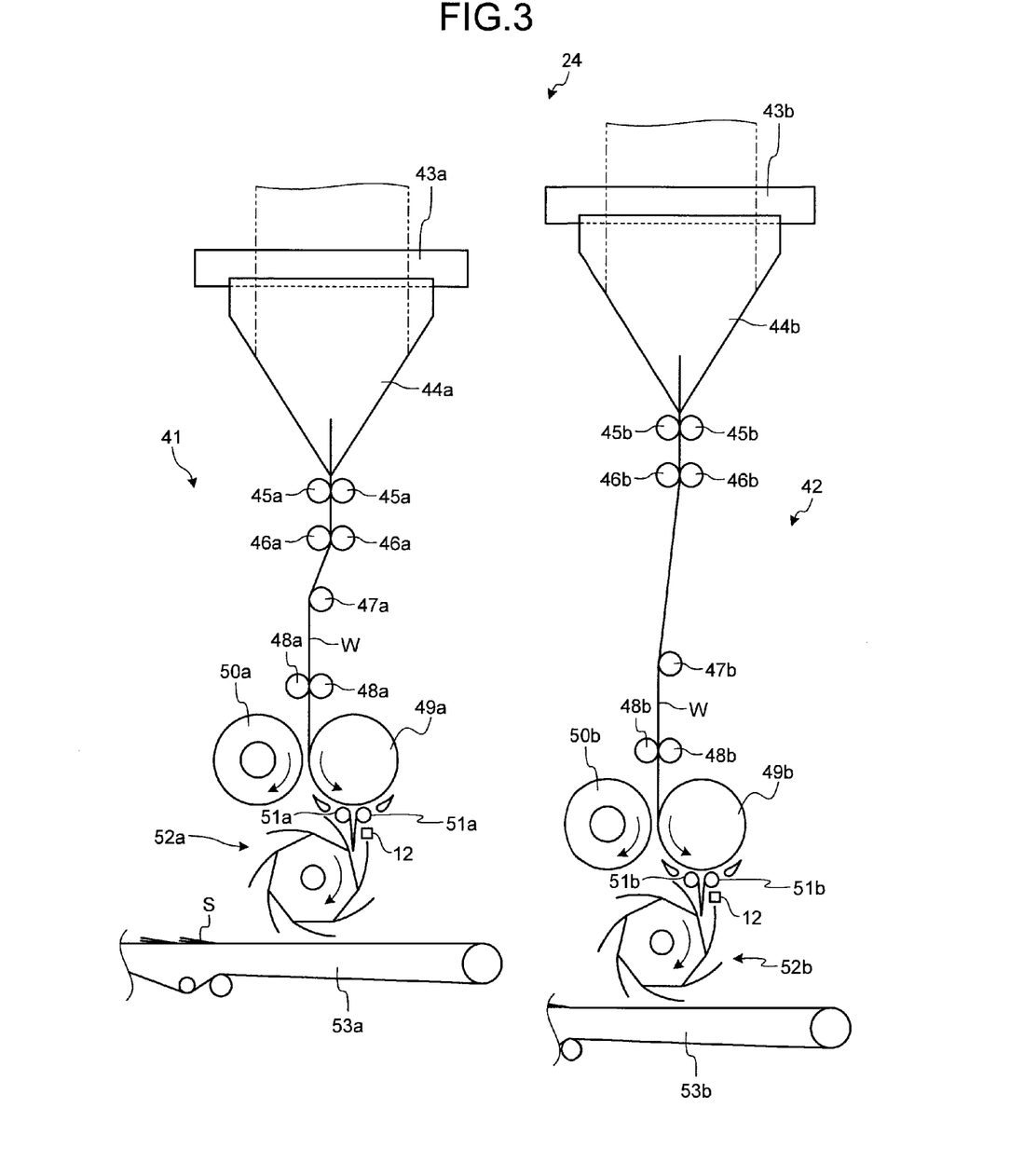
FIG. 3 is a schematic block diagram illustrating the main portion of a printing press according to a second embodiment of the present invention.

FIG. 3 is a schematic block diagram illustrating the main portion of a printing press according to a second embodiment of the present invention. Note that members having the same function as that of those of the aforementioned embodiment will be indicated by the identical symbols and not repeatedly explained.

As shown in FIG. 3, the printing press of the second embodiment is applied to a printing press for preparing newspapers as printed matter. This printing press includes an offset rotary press for printing predetermined information on a web using a printing plate, and a printer 12 for digitally printing the specific information desired by a reader and a reader identification information C at a specific location on the surface of the web. Furthermore, in the present embodiment, the printer 12 is located downstream of a folding unit (folding cylinder) of the offset rotary press, and configured to print specific information (variable information) on the signature (sheets) which has been formed by the folding unit and slowed down from the printing speed.

That is, the folding unit 24 of the offset rotary press has two folding units 41 and 42.

Each of the folding units 41 and 42 is configured almost in the same manner. Each of the folding units 41 and 42 is provided, at its topmost position, with drag rollers 43a and 43b for bringing in the web W folded in the predetermined order in the turn-bar unit as well as with triangular plates 44a and 44b. The triangular plates 44a and 44b are followed by lead-in rollers 45a and 45b, nipping rollers 46a and 46b, guide rollers 47a and 47b, and nipping rollers 48a and 48b, respectively.

The nipping rollers 48a and 48b are followed by folding cylinders 49a and 49b, and saw cylinders 50a and 50b, respectively, and the cylinders 49a and 49b are arranged opposite to the cylinders 50a and 50b. The saw cylinders 50a and 50b laterally cut the web W folded transversely. The folding cylinders 49a and 49b are followed by pairs of folding rollers 51a and 51b that are rotatable in sync with the folding cylinders 49a and 49b, respectively, so that folding blades (not shown) sandwich the web W protruded from the circumferential surface of each of the folding cylinders 49a and 49b, thereby forming a signature S. The folding rollers 51a and 51b are followed by bladed wheels 52a and 52b, while the bladed wheels 52a and 52b are followed by discharge conveyors 53a and 53b, respectively. The bladed wheels 52a and 52b each have a plurality of blades in the circumferential direction and rotate in sync with the folding rollers 51a and 51b, respectively. This allows the signature S formed by the pairs of folding rollers 51a and 51b to be sequentially received by each blade and then passed onto the discharge conveyors 53a and 53b, respectively.

The present embodiment has the printer 12 located downstream of the folding rollers 51a and 51b and upstream of the bladed wheels 52a and 52b.

Accordingly, the printer 12 prints specific information on the signature S formed by the folding rollers 51a and 51b. In this case, since the transfer speed of the signature S has been slowed down in the folding unit 24, it is possible to print specific information on the signature S that travels at lower speeds than the running speed (printing speed) of the web W being carried through the printing unit.

Note that the printer 12 was located downstream of the folding rollers 51a and 51b and upstream of the bladed wheels 52a and 52b. However, the printer 12 may also be located downstream of the bladed wheels 52a and 52b and upstream of the discharge conveyors 53a and 53b.

As described above, the printing press of the second embodiment is configured such that the printer 12 is located downstream of the folding unit in the offset rotary press in order to print specific information on a signature that has been formed by the folding unit and slowed down from the printing speed. When compared with the case wherein the printer 12 is located immediately after the printing unit, the printer 12 can print information on the signature S that is running at lower speeds, thereby making it possible even for a low-speed printer 12 to conduct in-line printing.

That is, the printer 12 may be located between the folding rollers 51a and 51b and the bladed wheels 52a and 52b, respectively. In this case, the transfer speed of the signature S is one half that of the case where the printer 12 is located immediately after the printing unit. When the printer 12 is located between the bladed wheels 52a and 52b and the discharge conveyors 53a and 53b, respectively, the transfer speed of the signature S is less than one tenth of that of the case wherein the printer 12 is located immediately after the printing unit. As a result, the arrangement of the present embodiment makes it possible to print specific information on any page of the newspaper at low printing speeds, thus allowing for employing even low-speed printers.

Note that in each of the aforementioned embodiments, the printer 12 was used to print the index of an individual reader. However, in this case, the index may also be that of predetermined individual groups or individual districts. Furthermore, in the present embodiments, the printer 12 digitally prints the index of specific information desired by a reader at a specific location on the front page of a newspaper. However, the invention is not limited to the index. It may also be possible to print the abstract of the specific information desired by a reader or the excerpts from advertisement. Furthermore, in the present embodiments, descriptions have been made to newspapers as printed matter; however, the invention may also be applicable not only to newspapers but also to advertisement or magazines.

INDUSTRIAL APPLICABILITY

The printing press and the method according to the present invention allow the rotary press to print information common to all the readers and the digital printer to digitally print specific information desired by a reader, and are applicable to printing presses for preparing any printed matter.

The invention claimed is:
1. A printing press, comprising:
a rotary press for printing predetermined information, using a printing plate, on a sheet travelling at a predetermined printing speed;
a digital printer for digitally printing specific information associated with a reader at a specific location on the sheet; and
a controller for collectively driving the rotary press and the digital printer, wherein the digital printer comprises:
an information database for classifying and storing the predetermined information;
a reader database for storing a class of the specific information associated with the reader;
a print data creation unit for selecting and laying out information based on the information of the information database and the information of the reader database; and a digital printer body for digitally printing the information laid out by the print data creation unit, wherein
the digital printer is disposed in a folding unit of the rotary press and downstream of a folding cylinder of the folding unit, and configured to print the laid-out information on the sheet travelling at a lower speed than the predetermined printing speed.

2. The printing press according to claim 1, wherein the print data creation unit is configured to create an identifier to access a detail of the laid-out information viewable through a network.

3. The printing press according to claim 1, wherein
the digital printer is configured to digitally print the specific information associated with the reader and reader identification information, and
the printing press further includes a sorting unit for sorting a printed matter by delivery destination by reading the reader identification information.

4. The printing press according to claim 1, wherein the digital printer is configured to print an index of an article or an advertisement associated with the reader on a front page.

5. A printing method, comprising:
causing a rotary press to print predetermined information, using a printing plate, on a sheet travelling at a predetermined printing speed;
selecting and laying out information based on given information and specific information associated with a reader; and
causing a digital printer to digitally print the laid-out specific information associated with the reader at a specific location on the sheet;
wherein the digital printer is disposed in a folding unit of the rotary press and downstream of a folding cylinder of the folding unit, and prints the laid-out specific information on the sheet travelling at a lower speed than the predetermined printing speed.

6. The printing method according to claim 5, wherein the digital printer prints the laid-out specific information on a signature, which has been formed by the rotary press and slowed down from the predetermined printing speed.

7. The printing press according to claim 1, wherein the digital printer is disposed upstream of a discharge conveyer and downstream of a bladed wheel.

8. The printing press according to claim 1, wherein the digital printer is disposed upstream of a bladed wheel.

9. The printing press according to claim 4, wherein the digital printer is configured to print an individual reader's index on the front page.

10. The printing press according to claim 4, wherein the digital printer is configured to print the index in view of the article or the advertisement of the reader's interest on the front page.

11. The printing press according to claim 4, wherein the digital printer is configured to print the index in order of the article or the advertisement of the reader's interest on the front page.

12. The printing press according to claim 4, wherein the digital printer is configured to control a printed number of index portions.

13. The printing method according to claim 5, wherein the digital printer is disposed upstream of a discharge conveyer and downstream of a bladed wheel.

14. The printing method according to claim 5, wherein the digital printer is disposed upstream of a bladed wheel.

* * * * *